United States Patent
Müntener

[19]

[11] Patent Number: 5,810,476
[45] Date of Patent: Sep. 22, 1998

[54] SHEARING AND MIXING TOOL

[75] Inventor: Kurt Müntener, Bad Salzuflen, Germany

[73] Assignee: Richard Frisse GmbH, Salzuflen, Germany

[21] Appl. No.: 719,582

[22] Filed: Sep. 25, 1996

[30] Foreign Application Priority Data

Oct. 27, 1995 [DE] Germany .................. 195 39 983.8

[51] Int. Cl.⁶ .................................................. B01F 7/04
[52] U.S. Cl. .................. 366/312; 366/325.5; 366/329.3; 366/330.3
[58] Field of Search ................ 366/279, 325.1, 366/327.1, 327.4, 329.1, 330.1, 330.3, 330.4, 330.5, 342, 343, 345, 325.8, 325.4, 325.5, 325.7, 312, 313

[56] References Cited

U.S. PATENT DOCUMENTS

| | | | |
|---|---|---|---|
| 2,109,077 | 2/1938 | Straight | 366/342 |
| 2,350,299 | 5/1944 | Presser | 366/330.4 |
| 2,802,650 | 8/1957 | Straight | 366/343 |
| 3,145,017 | 8/1964 | Thomas | 366/313 |
| 4,088,577 | 5/1978 | Muller | 366/313 |
| 4,214,376 | 7/1980 | Lucke et al. | 366/313 |
| 4,229,110 | 10/1980 | Lucke | 366/343 |
| 4,469,445 | 9/1984 | Wurtz | 366/343 |
| 4,941,750 | 7/1990 | Bouchez et al. | 366/330.3 |
| 5,055,273 | 10/1991 | Wilhelm et al. | 366/312 |
| 5,061,082 | 10/1991 | Steele, Jr. | 366/343 |

FOREIGN PATENT DOCUMENTS

| | | | |
|---|---|---|---|
| 670869 | 9/1963 | Canada | 366/313 |
| 1102534 | 4/1961 | Germany | 366/313 |
| 1276986 | 8/1970 | Germany . | |
| 4344995 | 7/1995 | Germany . | |
| 335043 | 12/1958 | Switzerland | 366/313 |
| 1025893 | 4/1966 | United Kingdom | 366/312 |

*Primary Examiner*—Tony G. Soohoo
*Attorney, Agent, or Firm*—Martin A. Farber

[57] ABSTRACT

An apparatus for shearing and mixing a product in an at least partially cylindrical trough has a shaft which is rotatably and concentrically supported in the trough. At least one support extends radially from the shaft and supports a tool which forms a rotor together with said shaft. The tool includes a shearing throwshovel which extends in circumferential direction of the rotor along a longitudinal axis and has a sickle tip on one end and a spoon-like formation on its opposite end. This shearing throwshovel forms a first angle by being bent, when seen in cross-section, from its sickle tip towards the opposite end, so as to deviate from the direction of the longitudinal axis; a second angle between a tangent to said inner surface of said trough and a tangent to said circumferential direction so as to have an increasing distance to the inner surface of the trough from said sickle tip towards the opposite end; and a third angle between said longitudinal axis and said shaft axis.

15 Claims, 8 Drawing Sheets

(I-I)

(II-II)

(III-III)

(IV-IV)

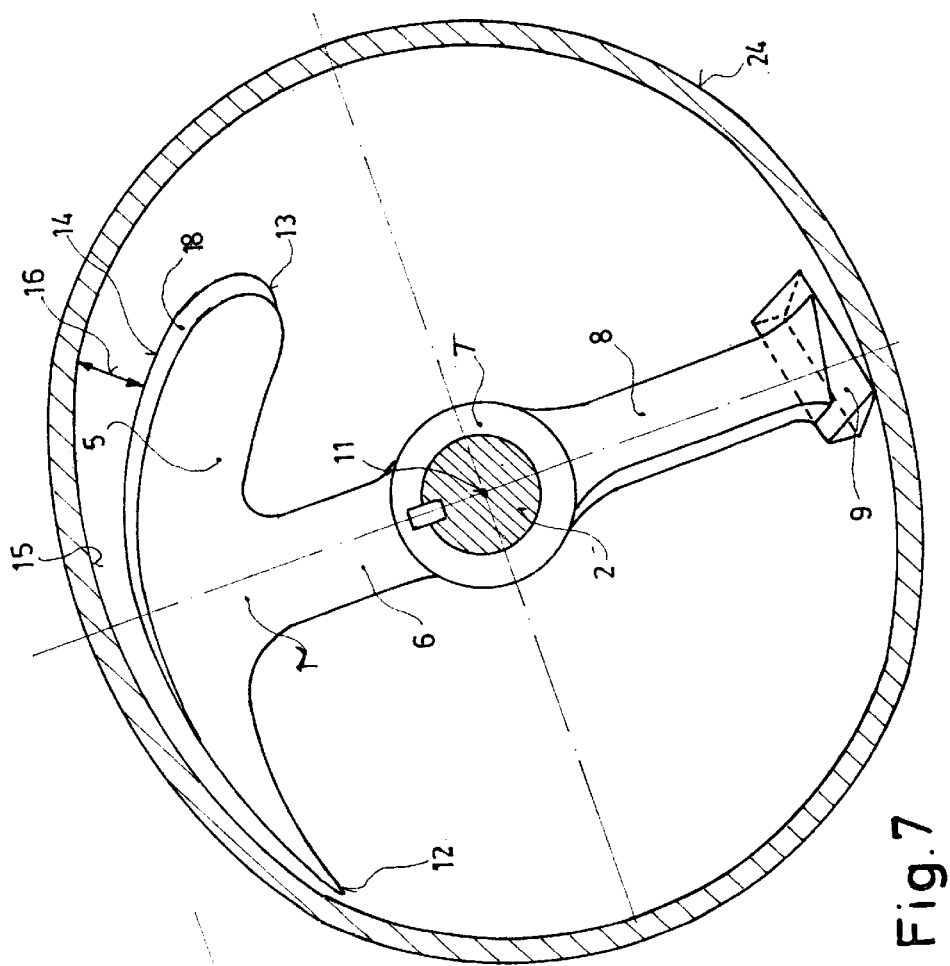
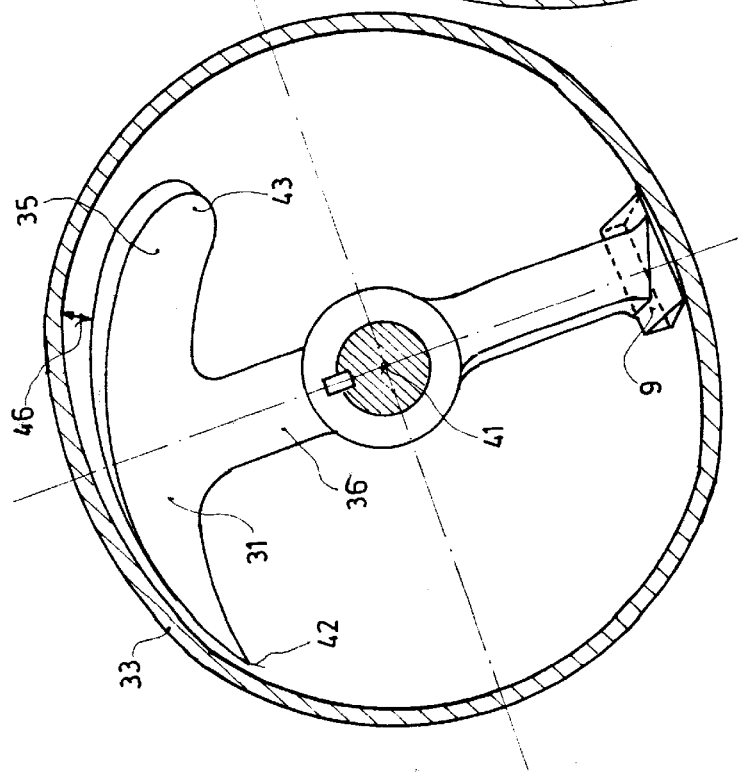

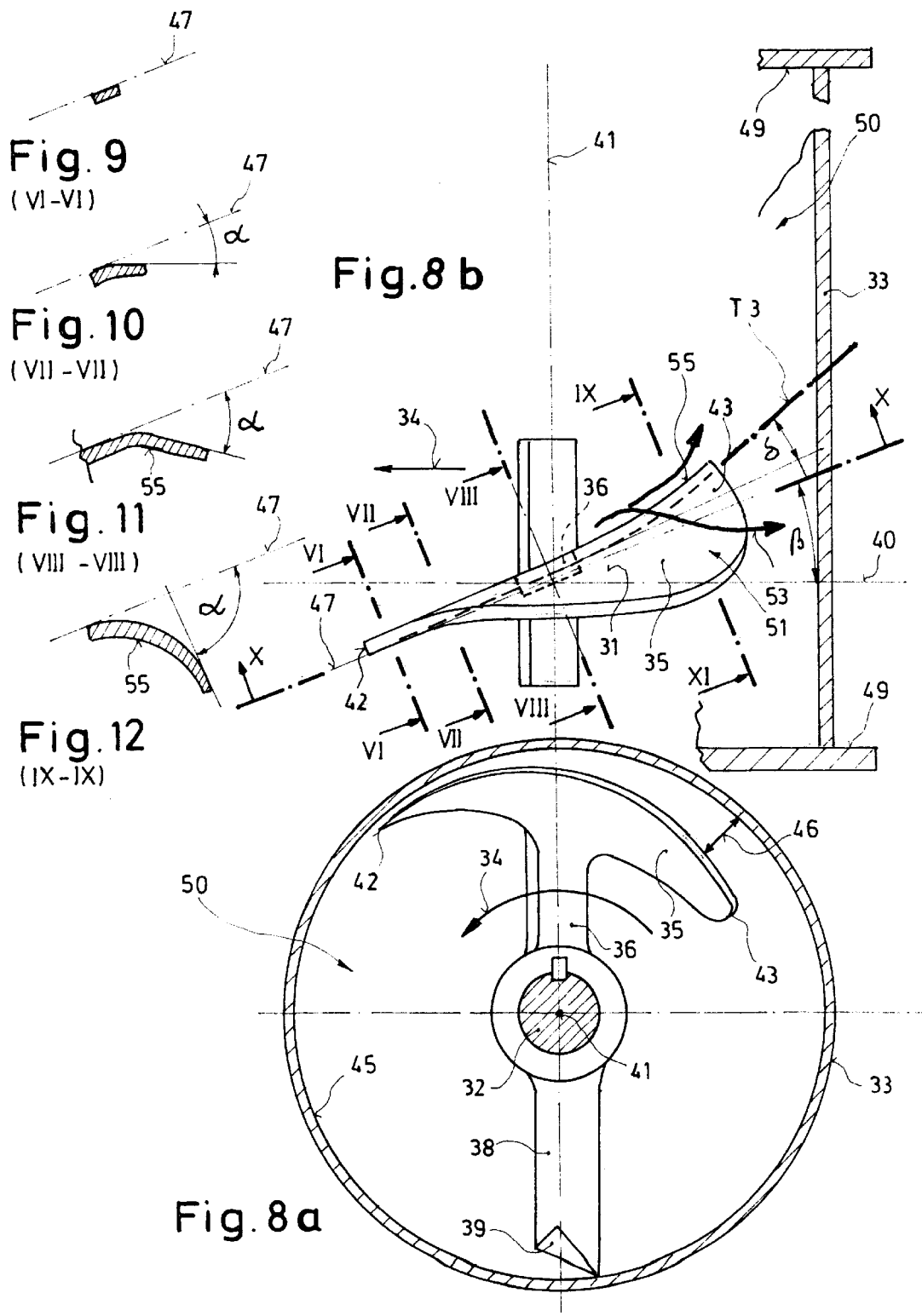

SHEARING AND MIXING TOOL

FIELD OF THE INVENTION

The invention sets out from known mixing tools as well as from known shearing tools which are fastened to a shaft which. in turn, is rotatably supported within an at least partially cylindrical trough, the mixing tools ending a small distance from the inner surface of the trough. The shaft is connected to a drive.

Such mixing tools and such shearing tools are known for decades and are, in most cases, used in substantially horizontally extending troughs or drums, in order to mix bulk material or more or less liquid masses and to treat them under shearing. In particular, shearing/mixing tools are used where pasty masses, such as chocolate masses, coatings and fill masses made from chocolate, have to be treated, i.e. refined or conched.

BACKGROUND OF THE INVENTION

One type of prior art is disclosed in DE-C-1,276,986 where ploughshare-like mixing tools are described. These mixing tools are arranged within a drum in such a manner that the product cannot be spread within a gap existing between the outer end of the tool and the inner surface of the drum, as would be the case with shearing tools. Spreading is impeded by providing a front clearance angle on the tool which opens against the direction of rotation. In order to attain its object, the bottom wall of the mixing tool may be displaced backwards or is inclined with respect to the drum's inner wall or the mixing tool itself is oblique so that the mixing tool has a cleaning function by scratching the drum's inner wall. For a tool purely intended for mixing purposes, such a configuration has no influence, because the mixing function, for which the tools are intended, is not affected.

Another type of prior art mixing tools are throwshovels. Mixing tools of this type comprise sickle shaped, straight and flat blades inclined to the axis transverse to the shaft's axis. They have a uniform minimum distance to the drum's inner wall, where the edge of the blade next to the drum's inner wall must, logically, be formed as an elliptic curve.

Such mixing tools are arranged within the drum so as to the product is neither pulled into the gap or pressed and sheared between the outer circumference of the mixing tool and the drum's inner surface, but is moved forward in front of it, nor that a wedge effect occurs. In other words: There is no shearing gap so that a change of structure of the material can hardly be established.

Shearing tools are also known which exert more a shearing effect than mixing the product. Such tools, over its length in axial direction of a trough, have a larger distance to the trough's inner surface in their front region, when seen in the direction of rotation of the tools, than in their back region, thus pulling the material in-between. With such tools, the mixing effect is quite negligible.

Furthermore, DE-A-4,344,995 discloses an invention which improves a known mixing tool, such as a ploughshare shovel, as to promote a change in the material's structure apart from the mixing effect. To this end, the mixing tool has a wider gap in its front region, when seen in the direction of rotation of the mixing tools, than in the back region.

With the intended products to be mixed, this results to a considerable wedging action onto the product, and the product caught within the narrowing gap, by the enlarging surface in the narrowing gap, cannot evade the pressure which will lead to a milling effect to the solids of a suspensions. The excessive friction, thus produced, may result in local overheating of the product which effect is, of course, undesirable.

SUMMARY OF THE INVENTION

It is an object of the present invention to improve a mixing tool, such as one of the throwshovel type, so that restructuring of the material is promoted besides the mixing effect, but at the same time to improve the tool so that it forms a shearing tool having a considerable mixing effect.

It is a further object to provide a combined shearing and mixing tool which can be manufactured at low costs.

An important object of the present improvement of a tool is to effect restructuring of the material going easy on the product, but being, nevertheless, highly effective. The tool should be constructed so as to provide a shearing gap which, whenever the Theological properties of the product, its structure or consistency change during a treatment period, there is always an optimal portion of the shearing gap as a part of its length.

Moreover, it is a further object to provide a tool where local overheating of the product as well as a milling effect acting onto the solids contained in suspensions are avoided.

According to the invention, these objects are achieved in that a) the shearing and mixing blade at the end of an arm comprises at least one sickle shaped and angled or spoon-like shearing throwshovel;

b) where the shearing throwshovel bent under an angle $\alpha$, when seen from its sickle tip to its end, either in circular form or as a progressively increasing or decreasing curve perpendicularly to the longitudinal axis of the shearing throwshovel;

c) the radially outer surface of the shearing throwshovel is also bent so that the distance between the trough's inner surface and the radially outer surface of the shearing throwshovel increases, when seen from the sickle tip; and d) the blade of the shearing throwshovel forms an angle $\beta$ with respect to the longitudinal axis of the shaft.

Thus, the shearing and mixing tool comprises a sickle shaped shearing throwshovel blade which is preferably circularly bent, when seen in cross-section and/or is suitably straight in its longitudinal direction, and rotates within the cylindrical trough under an angle of 1° to 45° obliquely to the axis of the shaft, e.g. with its tip in front. The bending angle of the shearing throwshovel, when seen in cross-section, is preferably increasing from the sickle tip on, and this way, the shearing throwshovel forms an angled, but preferably twisted spoon-like, surface, particularly ending at its free end almost parallel to the trough's or drum's inner surface. The distance of the periphery of the shearing throwshovel to the trough's inner surface increases with increasing bending angle, e.g. up to more than 50 mm.

It is preferred that the shaft, in addition to the arm with the shearing throwshovel, has at least a second arm provided with a conching tool, i.e. a tool which acts as a scraper in one direction of rotation, and as a shearing tool in the other direction. It will be understood that, in accordance with the product to be treated, the geometrical shape of the shearing throwshovel, its bending angle and/or curvatures, e.g. being made progressive or degressive, may be appropriately be adapted to result in an optimal treatment of the product, e.g. chocolate. For example, the shearing throwshovel may be bent, in addition to the above-mentioned bending in transverse direction, from the sickle tip on towards the left or right side wall, when seen in plan view.

The arrangement of the scraper tool on the, at least, second arm has the advantage that, when treating sticky or otherwise adhering material which may be easily adhere to the trough's inner surface, the product layer thrown to that inner surface by centrifugal force is removed by the following scraper so that the subsequent shearing throwshovel may treat still other proportions of the product between its periphery and the inner surface when reaching the same location. In this way, it is also ensured that discharge after termination of treatment is quite complete leaving only small residues of the product.

It is to be understood that instead of a scraper on the other arm might be replaced by a similar sickle-shaped, but flat, i.e. not bent when seen in cross-section. Alternatively it might be a shearing throwshovel as described above, or a shearing throwshovel bent to the side of its right or left side wall, and giving a uniform minimum gap to the trough's inner surface, similarly to those used in the prior art.

In accordance with a further preferred embodiment, a plurality of scrapers form a rotor, and an inner rotor has annular fastening members along the rotor's axis, the shearing throwshovels or the scrapers being held between the fastening members to form an outer rotor.

The construction of the shearing and mixing tool relative to the inner surface of the trough has the advantage that part of the product, such as chocolate mass, which, during one revolution of the respective shearing and mixing tool, exerts a relative movement (i.e. along the sickle shaped shearing throwshovel and, simultaneously, transversely to it in axial direction of the driving shaft) with respect to each of the shearing throwshovels due to distance of the periphery of the respective shearing throwshovel in relation to the inner surface of the trough which increases towards the twisted spoon-like end of the tool; thereby, the mass is pressed through the shearing gap resulting from the increasing bending angle which leads to an enlarging local distance of the throwshovel's periphery to said inner surface. In this way, a maximum mixing and shearing effect is achieved simultaneously with a single tool.

A further benefit is that the product, such as chocolate mass, is treated very gently. Whenever a proportion of product cannot be pressed through the shearing gap, be it because the gap at a certain location is too narrow or that this proportion is still too stiff, it will slide along the tool blade (which forms an angle with respect to the generatrices of the trough's inner surface), thus evading an undue pressure. Just with products which change their rheologic characteristics, their structure or properties with time, there will be always a shearing gap along the periphery of the tool blade which is ideal in its geometric form for the momentary condition of the product. At the same time, the angle of the shearing throwshovel relative to the generatrices of the trough's inner surface or to the longitudinal axis of its shaft promotes also its mixing action, because it shifts the mass in axial direction of the trough, while the radially inwards directed portion of the shearing throwshovel throws any material radially back to the center of rotation which has just been thrown radially outwards by the centrifugal force onto the inner surface of the trough where it is scraped off by the tool blade. Thus, a highly intensive shearing action is exerted onto the product, while it is, at the same time, thoroughly mixed.

According to a further preferred embodiment, the shearing throwshovel is arranged on its arm in such a manner that the spoon-like end points in the direction of rotation, while the sickle tip points in opposite direction.

The arrangement of the shearing and mixing tool according to the present invention permits not only to achieve an increasing or decreasing action of forces onto the product, but also a constant and uniform action over the peripheral length of the shearing throwshovel. This effect is defined by the physical relationship Force=shear strain in product times shearing area, or $$F = \tau \cdot A$$

and by the relationship of

Shear strain=Product viscosity times speed differential divided by distance differential, or $$\tau = \frac{\theta \cdot dv}{dy}$$

From this second relationship, it may easily be seen that with the arrangement of the shearing throwshovel according to the present invention which rotates within a trough or drum, the term diminishes with increasing distance differential dy. Now, if $\tau$ becomes smaller, the shearing area A in the first relationship has to become larger, as far as the action of force F shall remain constant with increasing distance of the periphery of the shearing throwshovel to the trough's inner surface over the length of the shearing throwshovel.

From this relationship, it may also easily be seen that by appropriately bending or angling the cross-section of the shearing throwshovel and choosing the distance of its periphery which increases from its sickle tip (i.e. the angle to the respective tangents to it and to the trough's inner surface) as well as by the angle of the tool blade to the generatrices of the trough's inner surface, optionally including a bending over the length of the shearing gap, any desired action of forces may be attained.

Therefore, the shearing and mixing tool is preferably used in conching and liquefier machines of the chocolate industry where simultaneous mixing, shearing, aerating (when throwing particles of the mass through the inner space of the conching machine) is effected. Chocolate masses can, thus, be restructured from an initially powdery mass to a pasty product and eventually into a liquid suspension of cocoa particles in fat (cocoa butter) without the risk of being locally overheated due to too high a friction, thus, resulting in a better aroma. In this connection, it is essential for the invention that the chocolate mass is not subjected to shearing within the shearing gap as long as the force for pulling the mass into it is not sufficient at a certain location of the periphery of the tool blade which permits a more gentle, but nevertheless efficient, treatment of the above-mentioned chocolate masses and establishing a better aroma. In this way, angles $\beta$ and $\gamma$ co-operate to this effect.

BRIEF DESCRIPTION OF THE DRAWINGS

Further characteristics and advantages will become apparent from the following description of preferred embodiments of the present invention given by way of non-limiting examples with reference to the accompanying drawings in which

FIG. 7 is a side view similar to FIG. 1, but taken along the line V—V of FIG. 2b;

FIG. 8a shows an arrangement of a shearing and mixing tool according to the present invention which is bent from its sickle tip in longitudinal direction towards its left side surface, and has, in cross-section, a curvature of a bending angle and radius which increase from the tip portion towards its spoon-like end, and has an increasing distance of its periphery to the inner surface of a trough or drum; the arrangement being shown in FIG. 8b in a plan view, the drum being in cross-section;

FIGS. 9 to 13 are cross-sectional views similar to those of FIGS. 3 to 7 so that FIG. 9 is a cross-sectional view of the shearing and mixing tool according to the present invention along the line VI—VI of FIG. 8b;

FIG. 10 is a cross-sectional view of the shearing and mixing tool according to the present invention along the line VII—VII of FIG. 8b;

FIG. 11 is a cross-sectional view of the shearing and mixing tool according to the present invention along the line VIII—VIII of FIG. 8b;

FIG. 12 is a cross-sectional view of the shearing and mixing tool according to the present invention along the line IX—IX of FIG. 8b; and FIG. 13 is a side view similar to FIG. 8a, but taken along the line X—X of FIG. 8b;

FIGS. 15a and 5b show an arrangement of a shearing and mixing tool according to the present invention which has a twisted, spoon-like front end and is bent towards its right side surface, when seen in the plan view of FIG. 15b which is similar to FIGS. 2b and 8b, and has, in cross-section, a curvature of a bending angle and radius which decrease from its spoon-like front end towards the sickle shaped end portion.

DETAILED DESCRIPTION OF THE DRAWINGS

Figure 1:
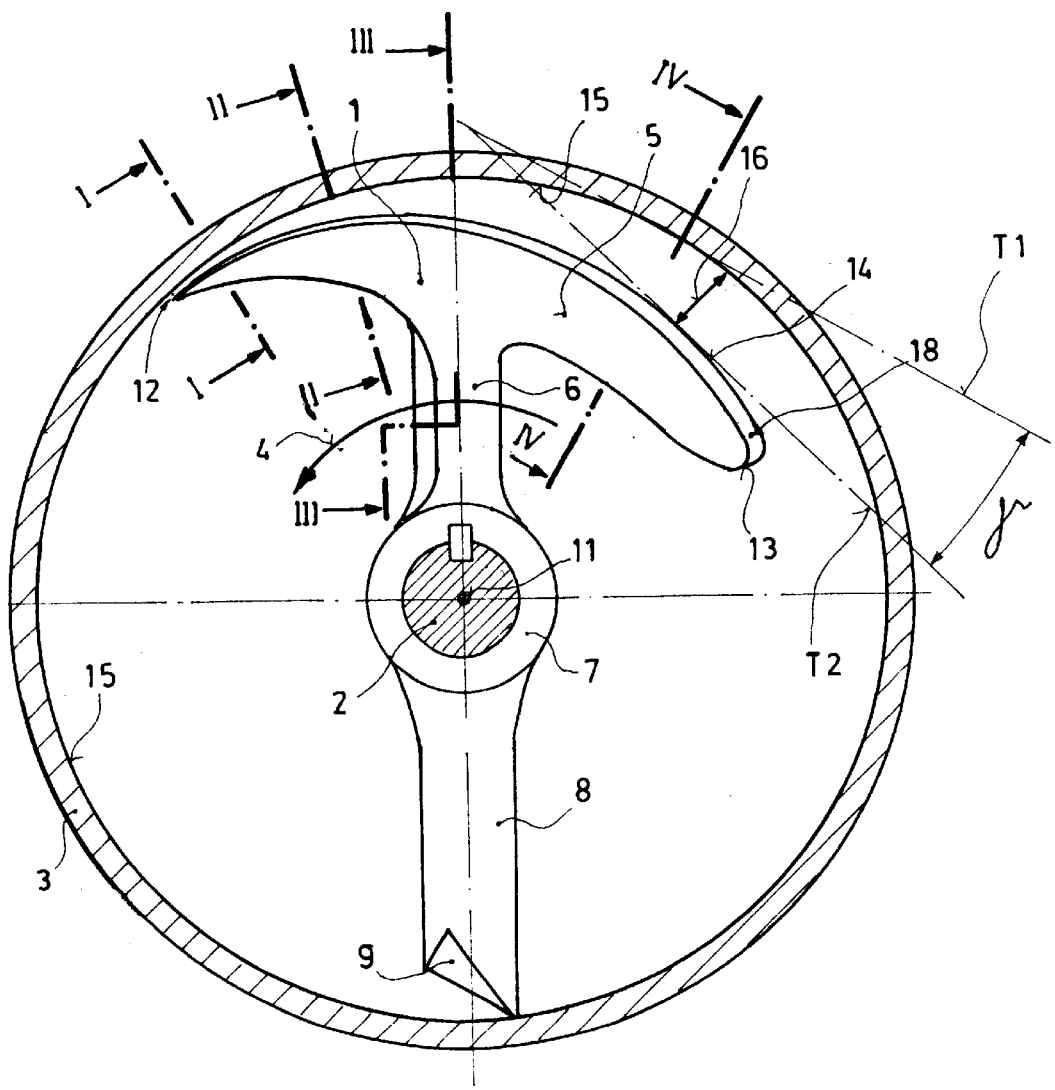
FIG. 1 shows an arrangement of a shearing and mixing tool according to the present invention which is substantially flat in its longitudinal direction, but is angled in cross-section to bend increasingly from its sickle shaped tip portion towards its spoon-like end, and has an increasing distance of its periphery to the inner surface of a trough or drum.

FIG. 1 shows a side elevation and cross-sectional view of a shearing and mixing tool 1 positively connected to a shaft 2 which, in turn, is concentrically arranged within a cylindrical trough or drum 3. A plurality of such shearing and mixing tools 1 (only one is shown; see also FIG. 16) on the shaft 2 form a shearing and mixing rotor. Arrow 4 indicates the direction of revolution of this shearing and mixing rotor. The arrangement is composed of the shearing and mixing tool which comprises a shearing throwshovel blade 5 on an arm 6, a fastening hub 7, a second arm 8 and a scraper tool 9. The arm 6 with its fastening hub 7 and the second arm 8 is either releasably fastened to the shaft 2 (see the tongue and groove connection as indicated in FIG. 1), or they are welded or otherwise connected to the shaft 2.

The shearing and mixing tool 1 shown in side elevation does not illustrate the true length of the shearing and mixing blade 5 which is substantially flat over most of its length, because it is situated under an angle to the generatrices of the trough or drum 3 and to an axis 10 (see FIGS. 2a and 2b) which is transverse to the axis 11 of the shaft 2. In contrast, the fastening hub 7, the second arm 6 and the scraper 9 exhibit their true length, because they are not inclined to the axes.

In its cross-section, the sickle shaped shearing throwshovel 5 is, suitably circularly, bend from its sickle tip 12 to a twisted, spoon-like opposite end 13 under a bending angle $\alpha$ (see FIGS. 3 to 6) which may even increase over its length. Due to the bending angle $\alpha$, the periphery 14 of the shearing throwshovel 5 has an increasing distance 16 to the drum's inner surface 15, thus forming another angle $\gamma$ with the respective tangents T2 and T1 on the periphery 14 and the inner surface 15, respectively. Its is clear that the distance 16 of the periphery 14 of the shearing throwshovel 5 to the inner surface 15, which increases with increasing bending angle $\alpha$, does not exhibit its true magnitude due to the above-mentioned inclination of the longitudinal axis 17 of the shearing throwshovel 5 to the axis 10 transverse to the shaft axis 11 under a further angle $\beta$ (see FIGS. 2a and 2b). The circular bending in cross-section of the shearing throwshovel 5 can only be seen in this side elevation by the area 18 of the width of the shearing throwshovel 5 which is increasingly visible from its sickle tip 12 on.

Figure 2A:
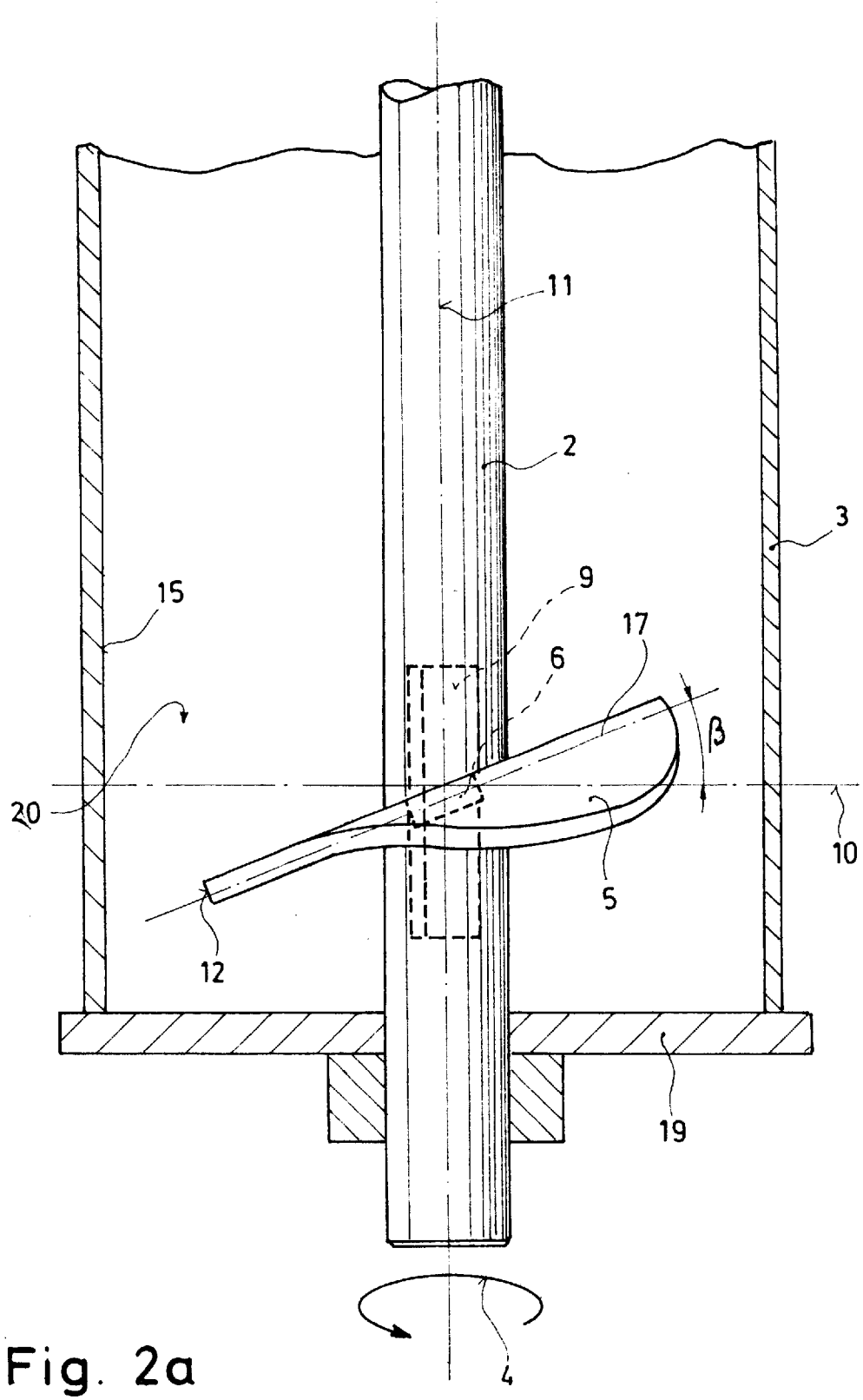
FIGS. 2a and 2b illustrate the arrangement of the shearing and mixing tool according to the present invention in a plan view, the drum being in cross-section.

From this, however, results that the increasing distance 16 corresponds to a third angle, i.e. the angle $\gamma$ between respective tangents T1 and T2 at the inner periphery of the trough 3 and at the outer periphery of the shovel 5. This angle $\gamma$ may be uniform over the circumference or may be increasing or decreasing. In any case, this angle $\gamma$ provokes a higher power being introduced into a chocolate mass, when rotating in counter-clockwise sense, as indicated in FIG. 1, but acts by pulling in and shearing when rotating in clockwise sense. The angle $\beta$ is measured between a longitudinal axis of the shovel 5 and a transverse plane, the transverse plane being perpendicular to the shaft axis 11 as shown in FIG. 2a.

Accordingly, in a shearing and mixing tool in accordance with the present invention there are three different angles including a first angle $\alpha$, a second angle $\gamma$, and a third angle $\beta$ which meet different aims at a single tool at the same time, namely:

α) mixing the mass in radial direction of the trough 3, opposite to the outwards acting centrifugal force;

β) mixing in axial direction of the trough 3; and

γ) introducing power into the product, such as chocolate mass, not at least by shearing.

All these objects can be attained by a tool according to the present invention which is easy to manufacture, especially by bending it appropriately. Although the magnitude of these angles may be freely chosen by those skilled in the art, the angle α will normally amount to 45° in average with a maximum of about 90°. In most cases it will amount to between 20° and 35°, e.g. 30°. The angle β will be about in the same range, but not exceeding 45°, whereas the angle γ is preferably smaller and will amount, for example, to 10° to 30°, particularly to 15° to 25°. Smaller angles than 10° are conceivable for γ, but are not preferred so that the above maximum values are of special importance for this angle.

When the shearing and mixing tool 1 rotates in the direction of arrow 4, part of the product will be pressed through the shearing gap 16 and towards the trough's inner surface as far as the force exerted is sufficient. In this way, angles β and γ co-operate to this effect. Parts of the product, which adhere there, are preferably removed from the trough's inner surface 15 by the scraper tool 9 following the shearing throwshovel 5 so that other parts of the product can be subjected to shearing and mixing treatment at this location when a shearing throwshovel 5 passes again.

Figure 2B:
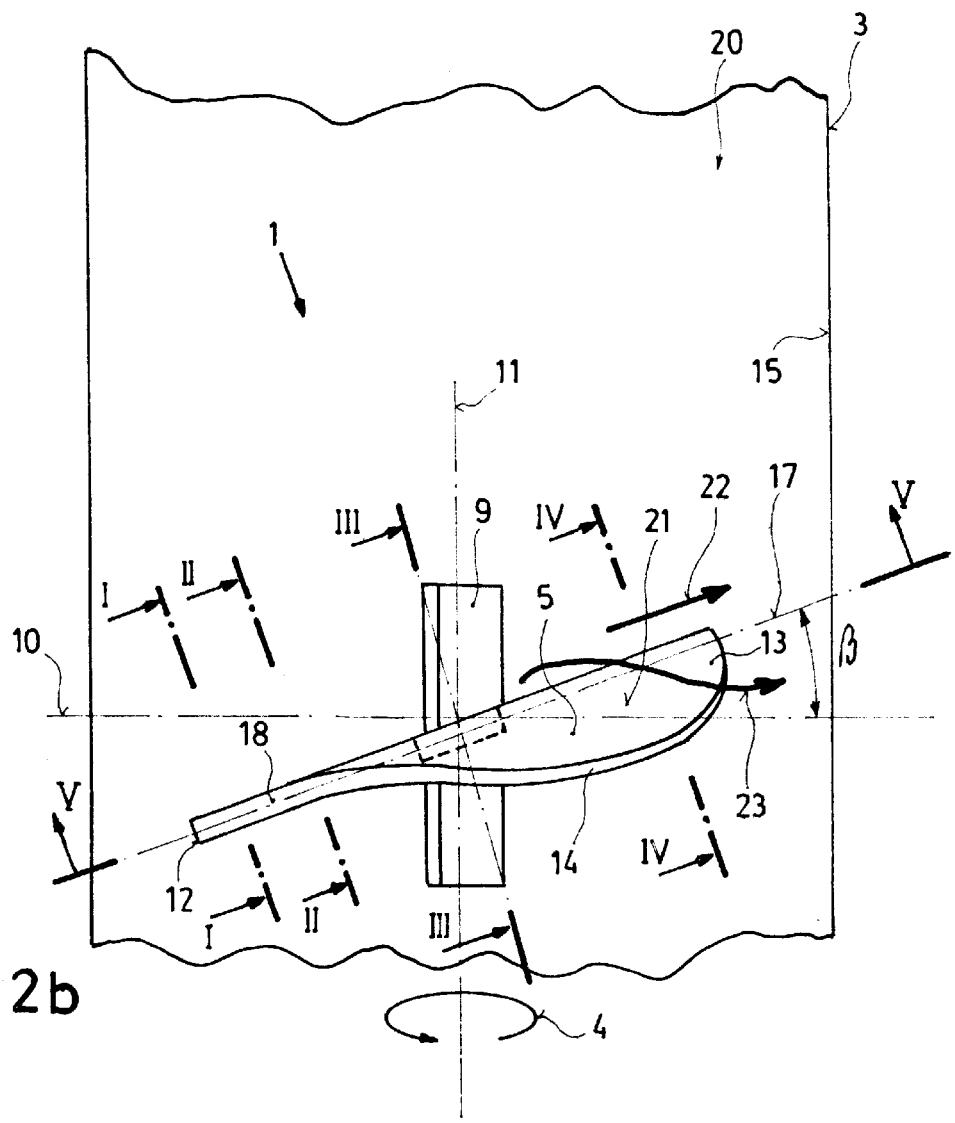

FIGS. 2a and 2b show a plan view and a cross-section through the trough 3 comprising a front wall 19 and an inner wall 20. The shaft 2 has its bearings in the front walls (only one front wall 19 is shown in FIG. 2a). Bearings are roughly schematically illustrated. In this plan view, the inclined position of the shearing throwshovel's 5 longitudinal axis under an angle β on its arm 6 in relation to the axis 10 transverse to the shaft axis 11 may be seen, whereas the scraper tool 8 (see FIG. 1) on the second arm 8 extends parallel to the shaft axis 11. As mentioned above, the actions of these tools 5 and 9 are complementary to each other. Therefore, it is advantageous, if at least one tool of one type and at least one tool of the other type are distributed over the circumference of a conching shaft 2.

The plan view shows also clearly a twisted spoon shaped surface 21 forming due to the substantially circular bending under a, preferably enlarging, angle α (when seen in cross-section) of the shearing throwshovel blade (see FIGS. 3 to 6) which opens from the tool's sickle tip on towards the opposite end 13. Also in this plan view, the bending's curvature can only be perceived by a surface 18 which defines the thickness of the shearing throwshovel blade and is visible less and less from the sickle tip on to the twisted spoon shaped surface 21 and from FIG. 3 to FIG. 6. Reference numeral 14 designates the periphery of the shearing throwshovel blade.

Arrow 22 indicates the movement and the direction of a part of product at relative speed in relation to the true circumferential speed of the shearing and mixing tool 1 (cf. FIG. 1), the part being not pressed through the shearing gap 16, thus being primarily subjected to a mixing treatment, whereas arrow 23 indicates the movement and the direction of another part of product in relation to the movement of the shearing throwshovel 5 which is pressed through the shearing gap 16 so that this part of product is primarily subjected to shearing.

Figure 3:
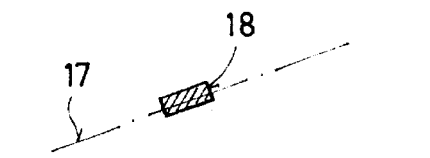
FIG. 3 is a cross-sectional view of the shearing and mixing tool according to the present invention along the line I—I of FIGS. 1 and 2.

FIG. 3 illustrates the shearing and mixing tool 1 and its shearing throwshovel 5 according to the present invention in a cross-sectional view along the line I—I of FIGS. 1 and 2b which is taken shortly after the sickle tip 12 after the shearing throwshovel 5 when seen in counter-direction to the direction of rotation 4. In this view, the shearing throwshovel 5 constitutes a narrow, flat blade.

Figure 4:
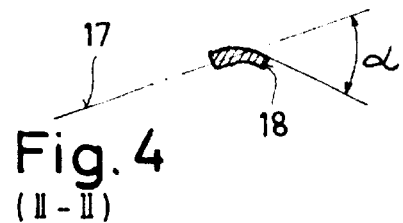
FIG. 4 is a cross-sectional view of the shearing and mixing tool according to the present invention along the line II—II of FIGS. 1 and 2.

FIG. 4 depicts the shearing and mixing tool 1 and its shearing throwshovel 5 according to the present invention in a cross-sectional view along the line II—II of FIGS. 1 and 2b and illustrates already a small bending angle α, which is preferably circularly bent with a predetermined radius, thus being inclined transversely to the longitudinal axis 17 of the shearing throwshovel 5 and to the direction of rotation 4.

Figure 5:
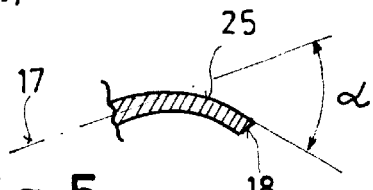
FIG. 5 is a cross-sectional view of the shearing and mixing tool according to the present invention along the line III—III of FIGS. 1 and 2.

FIG. 5 shows the shearing and mixing tool 1 according to the present invention in a cross-sectional view along the line III—III of FIGS. 1 and 2b within the region of the shearing throwshovel 5 and its arm 6, exhibiting already a larger bending angle α than in the cross-sectional view along the line II—II of FIGS. 1, 2b and 4. The bending is preferably circular and has the same predetermined radius as in FIG. 4, thus being inclined transversely to the longitudinal axis 17 of the shearing throwshovel 5 and to the direction of rotation 4.

Figure 6:
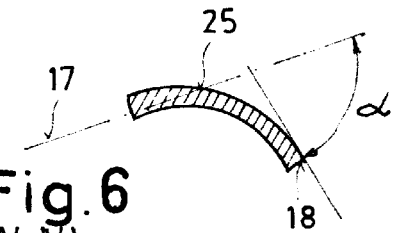
FIG. 6 is a cross-sectional view of the shearing and mixing tool according to the present invention along the line IV—IV of FIGS. 1 and 2.

FIG. 6 represents the shearing and mixing tool 1 according to the present invention in a cross-sectional view along the line IV—IV of FIGS. 1 and 2b within the region of the rear end 13 of the shearing throwshovel 5 opposite its tip, which is twisted as an inversed spoon and exhibits its maximum bending, the bending angle α now reaching up to 90° and even more, while the bending radius is preferably the same predetermined radius as before in FIGS. 4 and 5, thus being inclined transversely to the longitudinal axis 17 of the shearing throwshovel 5 and to the direction of rotation 4. Reference numeral 25 designates the outer surface of the shearing throwshovel 5.

FIG. 7 shows the shearing and mixing tool 1 according to the present invention in cross-section along the line V—V, parallel to or along the longitudinal axis 17 of the shearing throwshovel 5 and in a plan view. Due to the inclined position of the longitudinal axis 17 of the shearing throwshovel 5 to the axis 10 transverse to the shaft axis 11, the cross-sectional periphery 24 of the trough 3 is an ellipse.

The plan view onto the shearing throwshovel 5 on its arm 6 reveals its true length and width. The second arm 8 and the scraper 9 do not appear in its true dimension in this plan view. The distance of the shearing throwshovel periphery 14 to the trough's inner surface 15, i.e. the shearing gap 16, which becomes increasingly bigger and bigger in cross-section with increasing bending radius or angle of the blade of the shearing throwshovel 5 in counter-direction to the rotational direction 4 can be seen here in its true dimension without any distortion.

FIGS. 8a and 8b show an arrangement of a shearing and mixing tool 31 as well as a cross-sectional view of a trough 33 comprising an inner wall 45, at least one front wall 49 and an inner space 50, analogously to FIGS. 2a and b. In this embodiment, the shearing throwshovel 35; in addition to the transverse bending exhibited by the shearing throwshovel 5 of FIGS. 1 to 7, is bent to its left side surface 49 when seen in longitudinal direction in a plan view and in the rotational direction 34. In this way, a tangent T3 to the bending curvature forms a further angle δ with the longitudinal axis 47 of the tool. This angle δ has suitably about the preferred magnitudes of the angle γ.

Such an embodiment, upon rotation of the shearing and mixing tool 35 in the direction of arrow 34, provokes an accumulation of product on the side surface 55 of the broader end 43 of the shearing throwshovel 35 in the direction towards the longitudinal axis 47 and in counter-direction to the rotational direction 34, thus effecting an increased action of forces onto the product in the direction of the broadening shearing gap 46 at the inversely twisted, spoon shaped end of the shearing throwshovel 35 so that a larger proportion of product is forced through the shearing gap 46 in the direction of arrow 53. This embodiment shows how the action of forces onto the product can be controlled by specific and purposeful shaping the tool in accordance with the present invention. Analogously to FIGS. 1 to 7, the shearing and mixing tool 31 has an arm 36 which supports the shearing throwshovel 35; and there is a second arm 38 bearing a scraper 39. The shearing throwshovel 35 has a sickle tip 42 and a spoon shaped surface 51.

FIG. 9 illustrates that the cross-section of a shearing and mixing tool 31 according to the present invention along the line VI—VI of FIG. 8b, when seen in counter-direction to the rotational direction 34 up to shortly after the sickle tip 42 of the shearing throwshovel 35, shows a narrow, flat blade.

FIG. 10 shows that the cross-section of a shearing and mixing tool 31 according to the present invention along the line VII—VII of FIG. 8b exhibits already a small bending angle α, and is preferably circularly bent with a predetermined radius, transversely to the longitudinal axis 47 of the shearing throwshovel 35 and turned away from the direction of rotation 34.

FIG. 11 depicts that the cross-section of a shearing and mixing tool 31 according to the present invention along the line VIII—VIII of FIG. 8b and within the region of the shearing throwshovel 35 and its arm 36 exhibits already a larger bending angle α than in cross-section along the line VII—VII of FIG. 8b, and that the blade is circularly bent with a predetermined, but larger radius in FIG. 11 when compared with that of FIG. 10 transversely to the longitudinal axis 47 of the shearing throwshovel 35 and is turned away from the direction of rotation 34.

FIG. 12 represents the bending of the shearing and mixing tool 31 transversely to the longitudinal axis 47 of the shearing throwshovel 35 and turned away from the direction of rotation 34, the tool being shown in a cross-section along the line IX—IX of FIG. 8b through the region of the already inversely twisted, spoon shaped rear end 43 of the shearing throwshovel 35, when seen in the direction of rotation 34 It is there where it has its maximum bending angle α of up to 90° or more (but in average of about 45°), and a predetermined radius which, however, is larger than in FIGS. 8b and 11.

FIG. 13 depicts the shearing and mixing tool 31 according to the present invention in a cross-section along the line X—X of FIG. 8b. Reference numeral 41 designates the shaft axis of the shaft 32.

Figure 14:
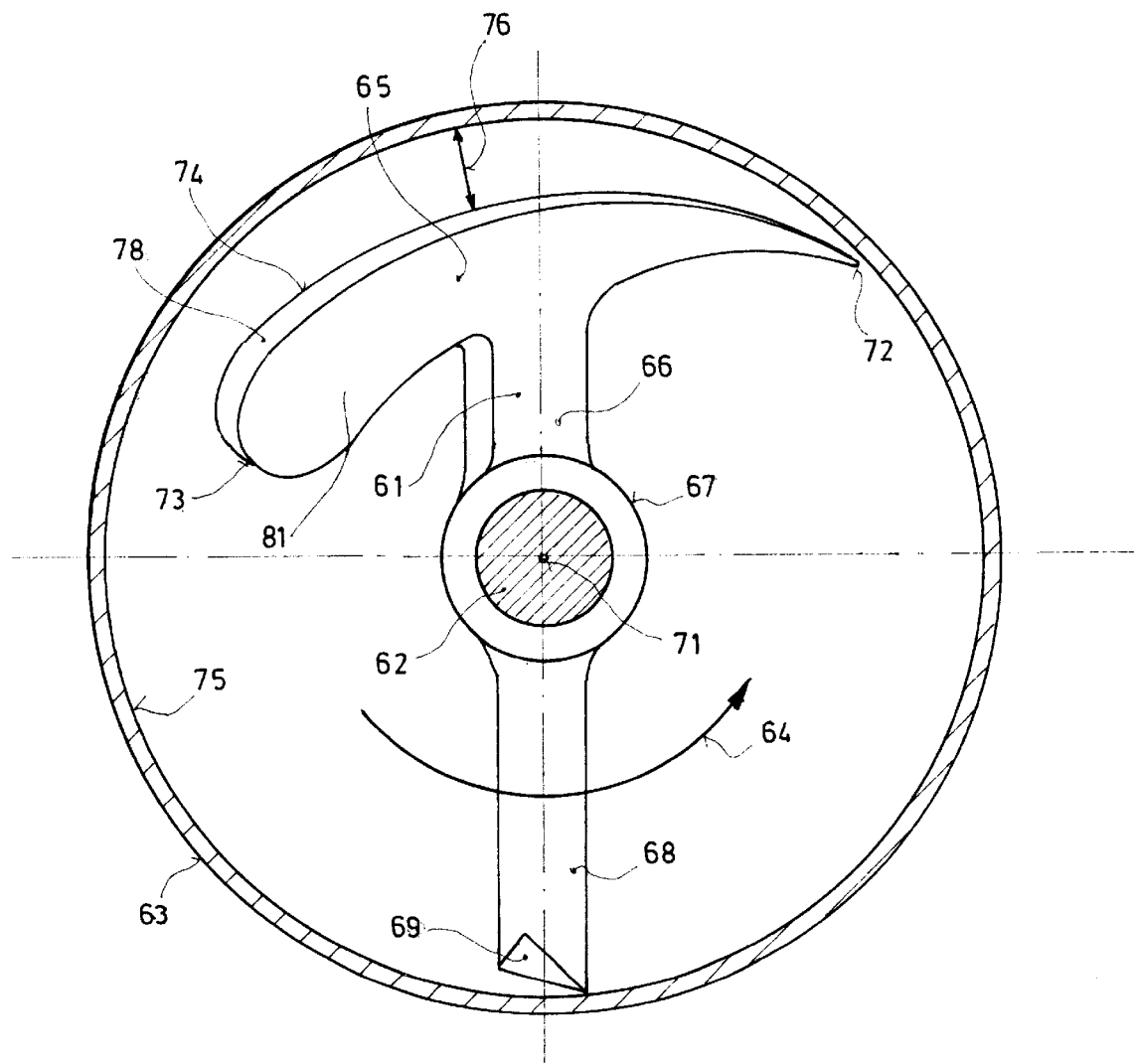
FIG. 14 shows an arrangement of a shearing and mixing tool according to the present invention which is substantially flat in its longitudinal direction, but is angled in cross-section to bend decreasingly from its spoon-like front end to its sickle shaped end portion, and has a decreasing distance of its periphery to the inner surface of the trough or drum from its spoon-like front end towards the sickle shaped end portion.

FIG. 14 shows a side elevation, partially in cross-section, a shearing and mixing tool 61 which is positively fastened to a shaft 62, e.g. by welding, and the arrangement of the shaft 62 supporting the shearing and mixing tool 61 within a drum-like trough 63. A plurality of such shearing and mixing tools 61 distributed over the axial length and in circumferential direction of the shaft 62 forms a shearing and mixing rotor. Arrow 64 indicates the direction of rotation of this shearing and mixing rotor. The shearing and mixing tool 61 comprises a shearing throwshovel 65 on an arm 66 including a fastening hub 67, and co-operates with a second arm 68 bearing a scraper tool 69. The arm 66 together with its fastening hub 67 and the second arm 68 is either releasably mounted on the shaft 62 (such as by a tongue and groove connection), or the arm 66 and its fastening hub 67 as well as the second arm 68 are welded to the shaft 62.

The side elevation of the shearing and mixing tool 61 does not reveal the true length of the shearing throwshovel 65 which is straight in its longitudinal direction at the end of arm 66, because the blade is inclined relative to the shaft axis 71. Since the fastening hub 67 and the second arm 68 together with its scraper 69 are not inclined with respect to this axis 71, or a transverse axis thereto, they appear with their true dimensions, i.e. length and width. The shearing throwshovel 65 is circularly bent under an increasing bending angle α, when seen in cross-section, from the spoon shaped front portion 73 on up to the sickle shaped opposite end 72 so that the periphery 74 is decreasingly spaced from the trough's inner surface 75. The distance 76 from the periphery 74 of the shearing throwshovel 65 to the inner surface 75 of the trough, which distance 76 diminishes with decreasing bending angle α, appears distorted and not with its true dimension due to the inclined position of the longitudinal axis of the shearing throwshovel 65 in relation to the transverse axis to the shaft axis 71. The circular bending of the cross-section of the shearing throwshovel 65 can only be derived in this side elevation by a spoon shaped surface 81 of the width 78 of the shearing throwshovel blade which decreases from the spoon-like front portion 73 on.

When the shearing and mixing tool 61 rotates in the direction of arrow 64, the entire product which is entrained by the inversely twisted, spoon shaped front portion 73 will be pressed through the shearing gap 66 and towards the trough's inner surface 76 as far as the force exerted is sufficient. The proportion of product which is pressed through this gap 66 will decrease with diminishing distance 76 from the periphery 74 to the trough's inner surface 75. Parts of the product, which adhere there, are preferably removed from the trough's inner surface 75 by the scraper tool 79 following the shearing throwshovel 65 so that other parts of the product can be subjected to a shearing and mixing treatment at this location when a shearing throwshovel 65 passes again.

Figure 15B:
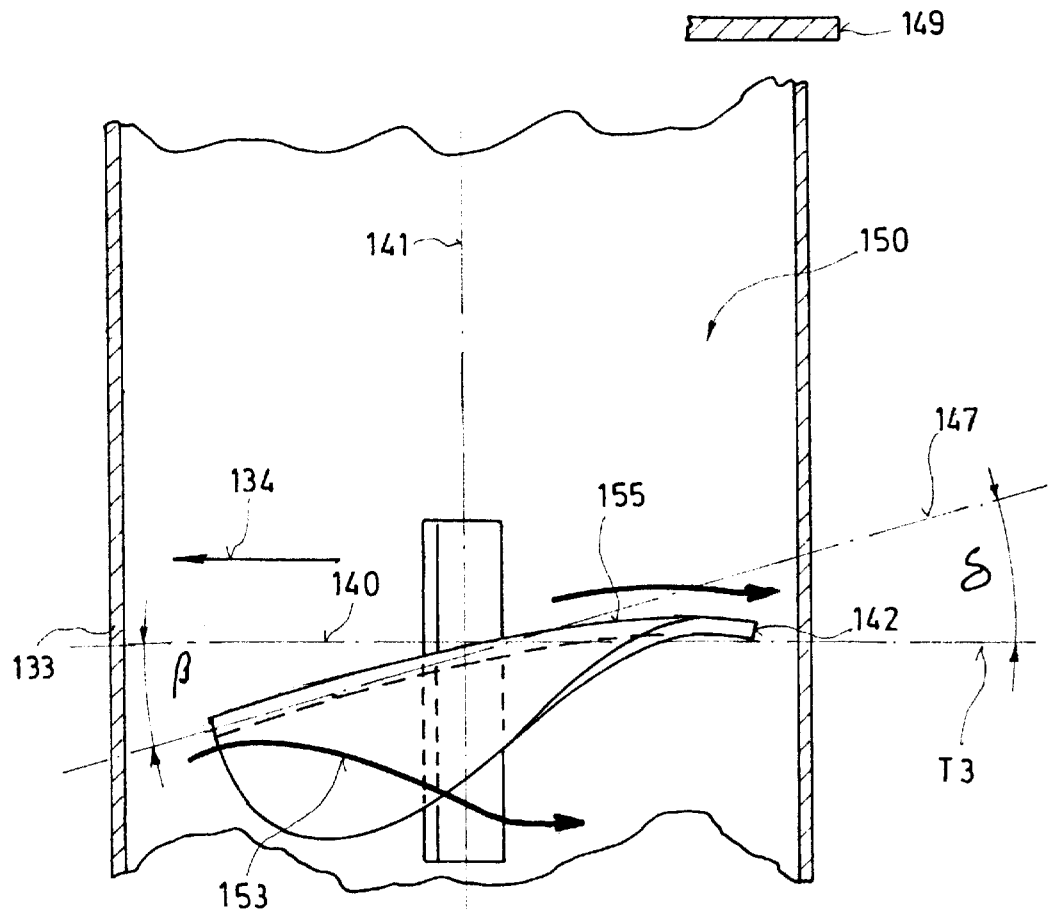
Figure 15A:
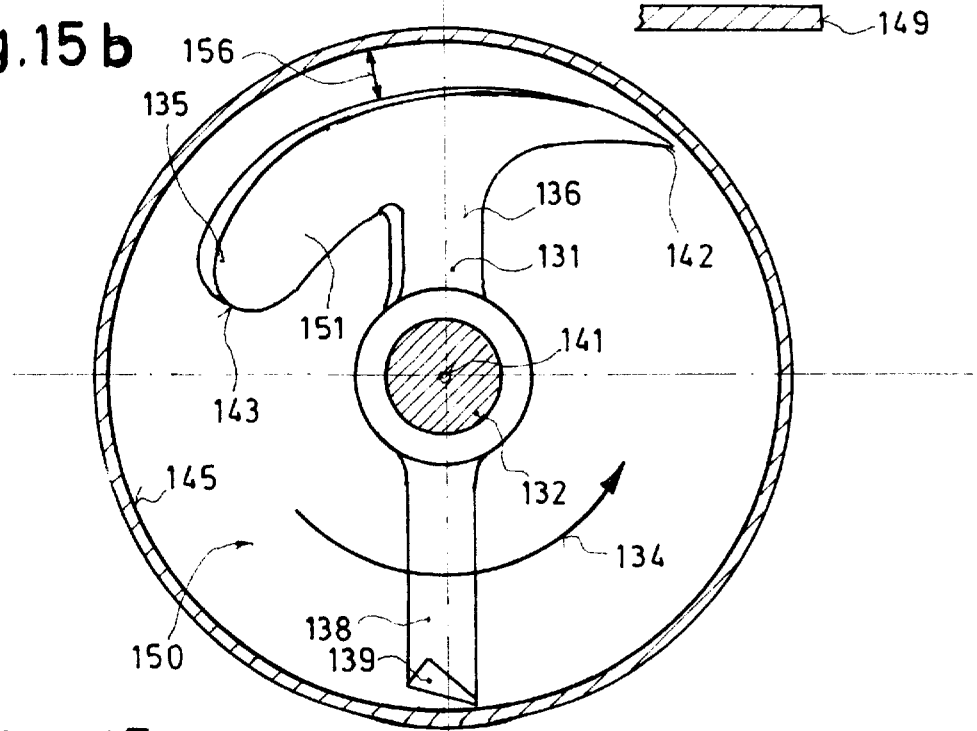

FIGS. 15a and 15b show an arrangement of a shearing and mixing tool 131 as well as a cross-sectional view of a trough 133 comprising an inner wall 145, at least one lateral front wall 149 and an inner space 150. The shearing and mixing tool 131 is constructed in an analogous manner as in FIGS. 1, 8a, 6b and 14 as to comprise an arm 136 supporting a shearing throwshovel 135, the set of tools including a second arm 138 supporting a scraper 139, the whole set of tools being fastened to shaft extending along an axis 141. The shearing throwshovel 135, in turn, extends along a longitudinal axis 147 which forms an angle β to a transverse axis 140. This tool 135 comprises a region 143 with a spoon shaped surface 151.

In this embodiment, the shearing throwshovel 135, in addition to the transverse bending exhibited by the shearing throwshovel 65 of FIG. 14, is bent to its right side surface 149 when seen in longitudinal direction in a plan view and in counter-rotational direction 134. Thus, a further angle δ, this time to the right side, is formed between a tangent T3 to the bending curvature and the longitudinal axis 147.

Such an embodiment, upon rotation of the shearing and mixing tool 131 in the direction of arrow 134, provokes a facilitated flow-off of product in the direction of the longitudinal axis 147 and in counter-rotational direction at the lateral surface 155 and at that end 142 of the shearing throwshovel 135 which is more and more sickle shaped, thus resulting in an action of forces onto the product which decreases in the direction of the narrowing shearing gap 156 towards the sickle shaped end 142 so that a smaller proportion of product is forced through the shearing gap 156 in the direction of arrow 153. Thus, this embodiment gives another example of how the action of forces onto the product can be controlled by specific and purposeful shaping the tool in accordance with the present invention.

Figure 16:
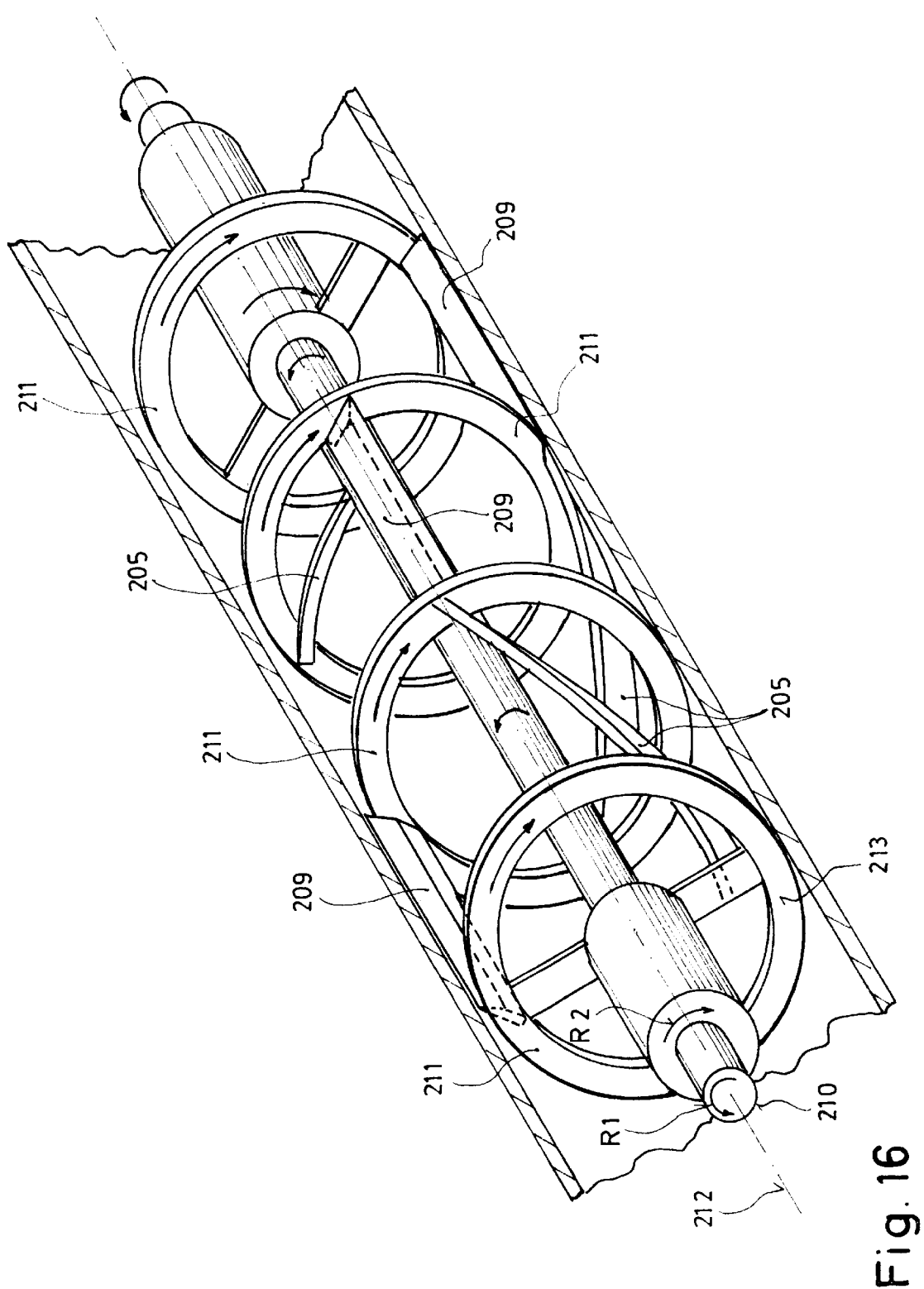
FIG. 16 is an axonometric representation of a rotor comprising a plurality of shearing throwshovel and scraper tools.

FIG. 16 shows an arrangement of a plurality of shearing throwshovels 205 and scrapers 209. A plurality of annular fastening members 211 are arranged in spaced relationship from one another to form an outer rotor 213 which rotates about an inner rotor 210 having an axis of rotation 212. The inner rotor 211 may have additional mixing tools attached (not shown), as is known per se in the field of conching machines. In-between the fastening members 211, the shearing throwshovels 205 and the scrapers 209 are mounted. Thus, the completed device forms a substantially cylindrical rotor assembly including an inner rotor 210 and an outer rotor 213. It is preferred that the inner and the outer rotor rotate at different speeds; in the embodiment shown in FIG. 16, arrows R1 and R2 indicate rotation of said inner and outer rotor even in different directions (which means positive and negative speed).

Although the invention has been described with reference to a fully cylindrical, drum-like conching trough, it will be understood that the invention may also be applied to partially cylindrical trough compartments of conching machines with more than one conching shaft, as are known to those skilled in the art. Moreover, the use of a second, opposite arm with a scraper has been described although the scope of this invention encompasses any arrangement and configuration of tools in combination with the shearing and mixing tool according to the present invention.

What is claimed is:

1. An apparatus for shearing and mixing a product, comprising:
   a wall forming an at least partially cylindrical drum having an inner surface;
   a shaft extending along a shaft axis and being rotatably and concentrically supported within said drum to rotate in at least one direction or rotation;
   a rotor disposed on said shaft and comprising a first tool and a support;
   wherein said support extends radially from said shaft and has an inner portion fixed to said shaft and a radially outer portion distant from said shaft;
   said first tool is mounted on said outer portion of said support for rotating about said shaft axis in a circumferential direction, said first tool including:
      a shearing throwshovel extending in said circumferential direction and having a tip on a first end of the throwshovel and a concave formation on a second end of the throwshovel opposite the first end; and wherein said throwshovel is laterally defined by first and second opposed side surfaces extending between the first end and the second end of the throwshovel;
   wherein a configuration and an orientation of said throwshovel is describable in terms of a coordinate system comprising:
      said shaft axis, and a first transverse plane extending transversely of said shaft axis and being oriented perpendicularly to said shaft axis; and
      a second transverse plane inclined to said first transverse plane and intersecting said first transverse plane along a first line, said first line intersecting said shaft axis and being perpendicular to said shaft axis;
   wherein said throwshovel extends generally along an axis of said throwshovel from said first end of said throwshovel to said second end of said throwshovel, said throwshovel axis being perpendicular to said first line;
   a portion of said throwshovel lies along said throwshovel axis and within said second transverse plane, and a second portion of said throwshovel extends from said first portion of said throwshovel and bends away from second transverse plane via a bend which extends generally parallel to said throwshovel axis, the bend being measured by a first parameter consisting of a first angle ($\alpha$) formed between a tangent to said second throwshovel portion and said second plane;
   said throwshovel has an arcuate surface located between said first and said second side surfaces, said throwshovel arcuate surface extending generally from the first end of the throwshovel to the second end of the throwshovel and facing said inner surface of said drum, said throwshovel arcuate surface being inclined relative to said inner drum surface to place the first end of said throwshovel relatively close to said drum inner surface and the second end of said throwshovel relatively far from said drum inner surface, inclination of said throwshovel arcuate surface to said drum inner surface being measured by a second parameter consisting of a radial distance between said throwshovel arcuate surface and said drum inner surface;
   inclination between said first transverse plane and said throwshovel axis is measured by a third parameter consisting of third angle ($\beta$); and
   said first parameter undergoes an increasing value with circumferential distance of said throwshovel from said first end to said second end, the increasing value of said first parameter producing an increasing value of said second parameter with said circumferential distance of said throwshovel from said first end to said second end.

2. Apparatus as claimed in claim 1, wherein said shearing throwshovel is bent away from said second transverse plane, in counter-direction to said direction of rotation by a bend which extends generally perpendicularly to said throwshovel axis, thus forming a fourth angle ($\delta$) measured between a tangent to said throwshovel arcuate surface and said throwshovel axis.

3. Apparatus as claimed in claim 2, wherein said fourth angle is 30° in maximum.

4. Apparatus as claimed in claim 3, wherein said fourth angle is 10° in minimum.

5. Apparatus as claimed in claim 4, wherein said fourth angle has a value in the range of 15° to 25°.

6. Apparatus as claimed in claim 1, further comprising a second tool including a scraper on said support for scraping said drum inner surface upon rotation of said rotor.

7. Apparatus as claimed in claim 1, wherein said support comprises at least one arm extending radially from said shaft.

8. Apparatus as claimed in claim 1, wherein said sickle tip is located at a front of said throwshovel with respect to said direction of rotation.

9. Apparatus as claimed in claim 1, wherein said first angle has a maximum value of approximately 90°.

10. Apparatus as claimed in claim 9, wherein said first angle has an approximate value of 45° in average.

11. Apparatus as claimed in claim 1, wherein said first angle is between 20° and 35°.

12. Apparatus as claimed in claim 11, wherein said first angle is about 30°.

13. Apparatus as claimed in claim 1, wherein said third angle is 30° in maximum.

14. Apparatus as claimed in claim 13, wherein said third angle is 10° in minimum.

15. Apparatus as claimed in claim 14, wherein said third angle has a value in a range of 15° to 25°.

* * * * *